US006929183B2

(12) United States Patent
Pettersson

(10) Patent No.: US 6,929,183 B2
(45) Date of Patent: Aug. 16, 2005

(54) RECONSTRUCTION OF VIRTUAL RASTER

(75) Inventor: Mats Petter Pettersson, Lund (SE)

(73) Assignee: Anoto AB, Lünd (SE)

( * ) Notice: Subject to any disclaimer, the term of this patent is extended or adjusted under 35 U.S.C. 154(b) by 237 days.

(21) Appl. No.: 10/310,941

(22) Filed: Dec. 6, 2002

(65) Prior Publication Data
US 2003/0122855 A1 Jul. 3, 2003

Related U.S. Application Data
(60) Provisional application No. 60/339,430, filed on Dec. 14, 2001.

(30) Foreign Application Priority Data
Dec. 6, 2001 (SE) .............................. 0104088

(51) Int. Cl.⁷ ................................. G06K 7/10
(52) U.S. Cl. ................... 235/462.25; 235/494
(58) Field of Search ............. 235/462.01–462.45, 235/472.01, 472.02, 472.03, 454, 455, 494; 382/240, 248, 251, 233, 238

(56) References Cited
U.S. PATENT DOCUMENTS

| 4,259,725 | A | * | 3/1981 | Andrews et al. ............ 715/856 |
| 5,091,966 | A | | 2/1992 | Bloomberg et al. |
| 5,124,537 | A | * | 6/1992 | Chandler et al. ......... 235/462.1 |
| 5,221,833 | A | | 6/1993 | Hecht |
| 5,446,271 | A | * | 8/1995 | Cherry et al. ............ 235/462.1 |
| 5,451,771 | A | * | 9/1995 | Robertson ............... 250/223 R |
| 5,477,012 | A | | 12/1995 | Sekendur |
| 5,635,699 | A | * | 6/1997 | Cherry et al. .......... 235/462.41 |
| 5,786,583 | A | | 7/1998 | Maltsev |
| 5,984,186 | A | * | 11/1999 | Tafoya .................. 235/462.24 |
| 6,141,446 | A | * | 10/2000 | Boliek et al. ............... 382/233 |
| 6,142,376 | A | * | 11/2000 | Cherry et al. .......... 235/462.14 |
| 6,257,490 | B1 | * | 7/2001 | Tafoya .................. 235/462.24 |
| 6,296,187 | B1 | * | 10/2001 | Shearer ................. 235/462.41 |
| 6,689,966 | B2 | * | 2/2004 | Wiebe ..................... 178/18.01 |
| 6,754,394 | B2 | * | 6/2004 | Boliek et al. ............... 382/240 |

FOREIGN PATENT DOCUMENTS

| EP | 0 764 944 A2 | 3/1997 |
| EP | 0 887 765 A2 | 12/1998 |
| WO | WO 00/73983 A1 | 12/2000 |
| WO | WO 01/16691 A1 | 3/2001 |
| WO | WO 01/26032 A1 | 4/2001 |
| WO | WO 01/26033 A1 | 4/2001 |
| WO | WO 01/26034 A1 | 4/2001 |
| WO | WO 01/75783 A1 | 10/2001 |

OTHER PUBLICATIONS

"Digital Image Processing", Rafael C. Gonzalez and Richard E. Woods, Addison–Wesley, 1992, pp. 61–68.

* cited by examiner

Primary Examiner—Thien M. Le
(74) Attorney, Agent, or Firm—Birch, Stewart, Kolasch, & Birch, LLP.

(57) ABSTRACT

A method aims at identifying, starting from objects in a digital image, a virtual raster included in a coding pattern. The objects in the image at least partially reproduce marks on a base, each mark being associated with a respective point of intersection of raster lines belonging to the virtual raster. The method comprises the steps of matching sets of objects against a cell unit, which corresponds to a recurring known basic element of said raster; when a set corresponds with the cell unit, identifying the objects in the set as approved; and reconstructing the virtual raster on the basis of the mutual arrangement of the approved objects. A computer program, a storage medium and a device for position determination are also described.

22 Claims, 9 Drawing Sheets

RECONSTRUCTION OF VIRTUAL RASTER

This application claims priority on provisional Application No. 0104088-0 and 60/339,430 filed on Dec. 6, 2001 and Dec. 14, 2001, the entire contents of which are hereby incorporated by reference.

FIELD OF THE INVENTION

The present invention relates generally to identification of coding patterns in digital images. More particularly, the invention relates to a method, a computer program and a storage medium for use in reconstruction of a virtual raster included in such a coding pattern.

The invention also relates to a device for decoding of positions from digital images of a coding pattern.

BACKGROUND ART

It is known to use a coding pattern to embed some type of information in a passive base such as a sheet of paper, a writing board or equivalent. A suitably programmed scanner, fax machine, camera or digital pen can then read, recreate and use the information embedded locally in the base. For example, graphical information on a base can be supplemented with embedded information which extends the functionality of the base. Such embedded information can comprise file data for full or partial recreation of the graphical information, commands, supplementary text or images, hyperlinks, absolute positions, etc.

Coding patterns are generally constructed around some form of machine-readable symbols or marks which are set out in relation to raster points of a regular, invisible raster on the base. Examples of such coding patterns are given in WO 00/73983, WO 01/26032, U.S. Pat. Nos. 5,477,012 and 5,221,833.

Generally, and in particular when the coding pattern is detected with a hand-held device such as a digital pen or scanner, the resulting image will contain, in addition to objects which correspond to the marks, also interference in the form of noise, geometric distortion, unevenness in signal level and/or sharpness, etc.

It is therefore generally a problem, before the decoding of the coding pattern, to be able to identify the symbols or marks in a way which is efficient in terms of computation and is not sensitive to interference.

The above problems and previously proposed solutions will be discussed below in connection with a special coding pattern which is described in detail in the above-mentioned patent publication WO 01/26032. The coding pattern consists of a raster and marks which are located at each raster point. The marks are preferably substantially round and are offset in relation to the raster points in any one of four orthogonal directions. The raster is virtual and is therefore invisible both to the eye and to sensors.

A coding pattern of the type in question can be used, for example, to code absolute positions on a base. This permits digital recording of information which is written and/or drawn by hand on the base with a digital pen. During the movement of the pen, images of the coding pattern are continually recorded locally at the pen point. A subset of objects in each of the images is decoded into a position. The decoded positions together constitute a digital description of the movement of the pen across the base.

Patent Publication WO 01/26034 describes an iterative technique for reconstruction of the virtual raster in a digital image of the above coding pattern. Each iteration involves the steps of identifying two adjoining objects; with knowledge of one object's location relative to its raster point and on the basis of a measured spacing between the objects, determining the raster point of the other object; and, starting at the raster point thus determined, looking for a new object within a search area which is defined with knowledge of the raster's nominal main directions. When all objects have been processed, one has worked through the image object by object and identified associated raster points and thereby reconstructed the virtual raster.

This technique is rapid, but it is relatively sensitive to interference because it is based on local decisions concerning individual objects and assessment of their positions relative to associated raster points.

An alternative technique is described in WO 01/75783. This uses Fourier analysis to extract direction vectors from a ensemble of points reflecting the location of the objects in the digital image. The overall main vectors of the ensemble of points are first determined, which main vectors are then used for correcting the ensemble of points with respect to rotation and scale errors in the image plane. Further main vectors in different parts of the corrected ensemble of points are thereafter computed in order to extract a measurement of perspective effects and phase shift. The ensemble of points is then finally corrected on the basis of these measurements, whereupon the virtual raster is given by the overall main vectors of the resulting ensemble of points. The technique is relatively insensitive to interference but in some circumstances it can be undesirably computation-intensive.

SUMMARY OF THE INVENTION

An object of the present invention is therefore to propose a technique which overcomes the above problems, and more specifically to propose a technique permitting robust and/or computation-efficient identification of a virtual raster in a digital image of a coding pattern.

These and other objects which will become evident from the following description are achieved wholly or partly by a method; a computer program, a storage medium and a position-determining device according to appended claims 1, 19, 20 and 21, respectively. Preferred embodiments are defined in the dependent claims.

By virtue of the fact that sets of objects in the digital image are matched against a cell unit which corresponds to a recurring, known basic element of the raster, the influence of interference in the form of fictitious objects is limited since most of these are not placed in correspondence with the cell unit and are therefore filtered out during matching. If any isolated object is incorrectly identified as approved during the matching, then the matching of surrounding objects is affected only to a limited extent. The matching can also be carried out in a computation-efficient manner.

From the computation point of view, it can be advantageous, both during the matching and the reconstruction, to let the objects in the image be represented by a ensemble of points. Each object can thus be represented by a point whose position can correspond to a point of gravity of the object, a maximum or minimum luminance value of the object, etc.

The above-mentioned cell unit can be represented by a polygon whose corners connected via side lines are each associated with an object. Such a polygon thus corresponds to the basic element of the raster in respect of the number of side lines and the number of associated marks. By contrast, the extent and form of the cell unit can deviate from that of the basic element in order to take account of geometric distortion in the digital image.

According to one embodiment, the matching is carried out as a regular comparison between sets of objects in the digital image and a number, depending on the imaging conditions, of possible cell units of different extent and form. Alternatively, the image is first corrected, at least with respect to rotation in the image plane, whereupon the matching is carried out by comparing the sets with a cell unit which may be identical to the basic element.

According to an alternative embodiment, a data structure is first created which indicates the neighbor relationships of the objects. During the matching, the data structure is then used in order to identify said sets from among the objects. A neighborhood criterion is thus used to select those sets of objects which are on the whole allowed to be matched against the cell unit, which makes the matching more efficient. By virtue of the preliminary selection, it may also be possible to apply a less strict matching criterion, for instance that the set and the cell unit only need to have the same number of objects, which can reduce the risk of correct objects being missed in the matching, particularly in the initially described coding pattern whose marks are offset relative to their points of intersection. The above-mentioned neighborhood criterion can be that the objects in a set must form a cyclic structure of neighbors and that this cyclic structure must correspond to the cell unit, at least in respect of the number of objects associated therewith. The matching step can thus be reduced to identifying cyclical structures with a given number of objects, which can easily be done by a sequence of lookups in the data structure.

In order to increase the tolerance to interference still further, the matching can be preceded by elimination of all the objects which are not mutual neighbors, i.e. the matching is carried out only for those objects which, according to a given criterion, have each other as their most probable neighbor.

The insusceptibility to interference can be further increased by the virtual raster being reconstructed on the basis of a subset of objects, which contains approved objects forming a contiguous area corresponding to several adjacent cell units. The contiguous area may preferably be formed so as to comprise at least the approved objects which are connected in pairs by a side line which is common to two cell units.

The virtual raster can be reconstructed by the approved objects, at least those in the above-mentioned subset of objects, each being allocated a raster position in a raster coordinates system on the imaged base, and by the virtual raster being reconstructed by the location of the objects in the digital image being coupled to their allocated raster position on the base.

According to one example, the raster lines of the raster are computed by regression adaptation of the location of the approved objects along given directions, which directions can be extracted based on the above-mentioned raster positions.

According to another example, a homogeneous transformation matrix is computed based on the coupling between the positions of the approved objects and the positions of the corresponding points of intersection located on the base.

According to an embodiment for processing a sequence of digital images, a current digital image is first corrected for rotation in the image plane via a first transformation matrix, after which the above-mentioned homogeneous transformation matrix is computed based on the rotation-corrected image. Before processing of a new current image, the first transformation matrix is updated on the basis of the last computed homogeneous transformation matrix. This embodiment is efficient in terms of computation because the first transformation matrix does not need to be computed starting from objects in each current image.

BRIEF DESCRIPTION OF THE DRAWINGS

The invention will be described below in more detail with reference to the accompanying drawings which schematically illustrate currently preferred embodiments.

DESCRIPTION OF THE PREFERRED EMBODIMENTS

The description below is based on position determination based on digital images of a position-coding pattern. The position-coding pattern can be of any type, for example one of the patterns mentioned by way of introduction. In the following, however, the invention is illustrated in connection with the pattern which is described in Applicant's Patent Publications WO 01/16691, WO 01/26032 and WO 01/26033, all of which are incorporated herein by this reference. This pattern is described briefly below with reference to FIG. 1.

The position-coding pattern comprises a raster 10 which is made up of a number of raster lines 11. The raster 10 is virtual in the sense that it is neither visible to the human eye nor can be detected directly by a device which is to determine positions on the surface. The raster 10 can be considered as being made up of a multiplicity of identical basic elements, in this case squares, which are arranged side by side. The position-coding pattern also comprises a plurality of marks 12 which, depending on their location, each represent one of four values from "1" to "4". The value of the mark 12 depends on where it is placed in relation to its nominal position 13. The nominal position 13, which can also be called a raster point, is represented by the point of intersection between the raster lines 11.

Figure 1:
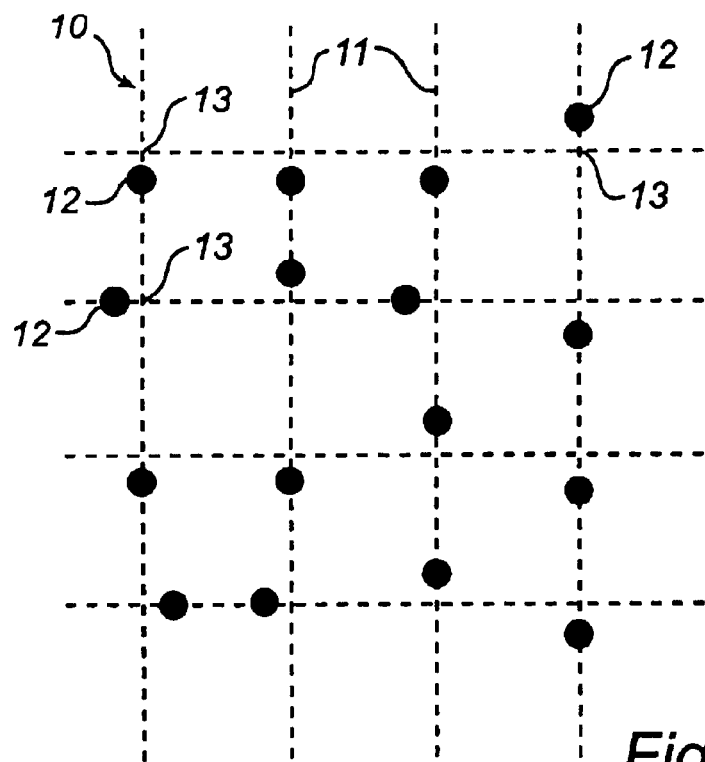
FIG. 1 is a schematic view of a set of 4×4 marks in a coding pattern.

In the example in FIG. 1, there are four possible locations, one on each of the raster lines extending from the nominal position 13. The displacement from the nominal position 13 is the same for all values. Each mark 12 is displaced with its center of gravity relative to its nominal position 13, i.e. no mark is located at the nominal position. In addition, there is only one mark 12 per nominal position 13.

The displacement is preferably about ⅙ of the raster line spacing, because it is then relatively easy to decide to which nominal position a particular mark belongs. The displacement should be at least approximately ⅛ of the raster line spacing, since otherwise it can be difficult to determine a displacement, i.e. the requirements for resolution become great. On the other hand, the displacement should be less than approximately ¼ of the raster line spacing so that it will be possible to determine to which nominal position a mark belongs.

In this example, each mark 12 consists of a more or less circular dot with a radius which is approximately the same size as the displacement or slightly less. The radius can be between about 25% and about 120% of the displacement. If the radius is much larger than the displacement, it can be difficult to determine the raster lines. If the radius is too small, greater resolution is required to record the marks. The marks do not, however, need to be circular or round, and instead they can have any suitable shape, such as square, triangular, elliptical, filled-in, open, etc.

The pattern described above can be designed to code a very large number of absolute positions. For example, the pattern can be such that 6×6 adjacent marks together code a position in the form of an x-coordinate and a y-coordinate. If a subset of the pattern is applied to a product, it is possible to obtain an electronic representation of what is written or drawn on the product using a pen, by continually determining the position of the pen on the product by reading the local combination of marks. This reading can be carried out by optical detection.

Figure 2:
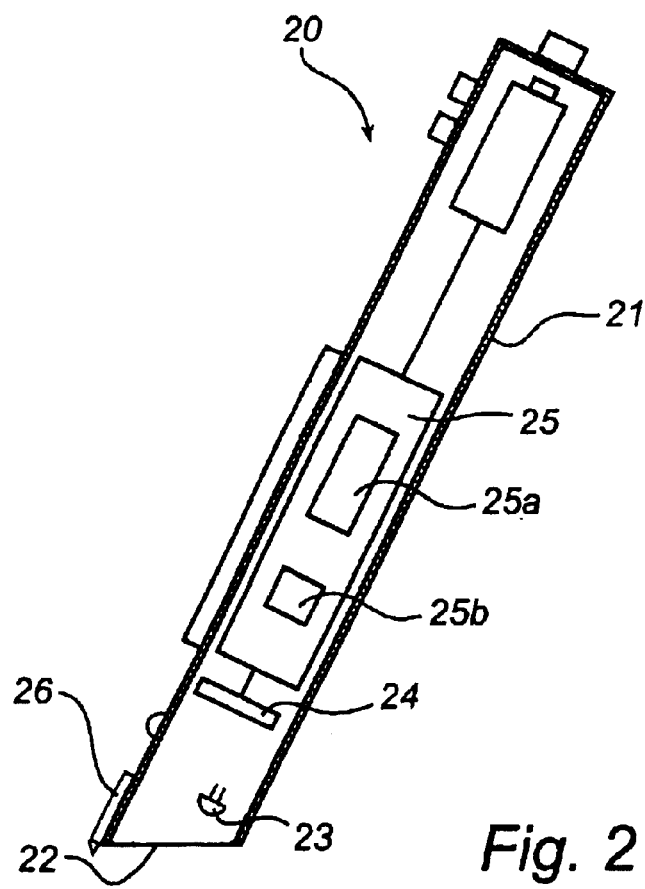
FIG. 2 is a schematic view of a hand-held device which can be used to detect the coding pattern in FIG. 1.

FIG. 2 shows a hand-held device 20, below called a pen, which is used for optical detection of the position-coding pattern in FIG. 1. The pen's main components are described briefly below according to one embodiment. For a more complete description, reference may be made to the above-mentioned patent publications WO 01/16691, WO 01/26032 and WO 01/26033.

The pen 20 has a casing 21 which is in the shape of a pen and which defines an opening 22 at one short side. The short side is intended to bear against or to be held a short distance from the surface on which the position determination is to be carried out.

One or more infrared light-emitting diodes 23 are arranged at the opening 22 for illuminating the surface area which is to be imaged, and an IR-sensitive area sensor 24, for example a CCD or CMOS sensor, is arranged to record a two-dimensional image of the surface area.

The area sensor 24 is connected to a data processor 25 which is arranged to determine a position on the basis of the image recorded by the sensor 24. The data processor 25 can contain a processor means 25a which may be programmed to process images from the sensor 24, or from a memory assigned to the sensor 24, for position determination on the basis of these images.

The processor means 25a can include a microprocessor, such as a CPU (central processing unit), a DSP (digital signal processor) or some other programmable logic device, such as an FPGA (field-programmable gate array). The processor means 25a can alternatively, or additionally, include a hardware circuit such as an ASIC (application-specific integrated circuit) and/or discrete analog and digital components.

The memory means 25b preferably comprises different types of memory, such as working memory (RAM), program memory (ROM/FLASH) and persistent storage memory (FLASH). In a known manner, the working memory can store data while this is being processed by means of the processor means 25a, the program memory can store the program code which is executed by the processor means 25a in the working memory, and the persistent storage memory can store the result of the processing, such as position coordinates.

The pen 20 also has a pen point 26 which deposits marking fluid on the base. The user can thus write physically on the base, while at the same time what is being written is recorded digitally via optical detection of the position-coding pattern. The marking fluid is suitably transparent to infrared light, while the marks 12 of the position-coding pattern (FIG. 1) absorb infrared light. This means that the marking fluid does not interfere with the detection of the pattern.

When the pen 20 is moved across a position-coded base, the area sensor 24 thus records a sequence of digital gray-scale images which are transmitted to the data processor 25 for position determination. In the images, the marks 12 (FIG. 1) appear as dark objects against a light background. Each object normally covers several pixels.

To be able to decode an image, the data processor has to reconstruct the virtual raster and determine the locations of a given number of objects relative to the latter.

Before the reconstruction of the virtual raster, the data processor 25 first carries out a so-called segmentation process in order to isolate the objects from the background in the gray-scale image and thereby reduce the amount of data to process in subsequent steps. This can be done by means of a thresholding operation which is well known to the person skilled in the art and results in a binary image. To further reduce the amount of data, the data processor can extract an ensemble of points from the binary image, for example by computing the center of gravity of the respective object. The final result of the segmentation process can thus be a binary image (bitmap) in which each object is identified by at least one pixel, or some other data structure which contains a location indication for each object with pixel or subpixel resolution.

The segmentation process will generally also identify fictitious objects, i.e. objects without equivalence in the imaged subset of the position-coding pattern, for example resulting from noise, lighting variations or artefacts (dirt, irregularities, etc.) on the position-coded base. Such fictitious objects can disturb the decoding process.

Figure 3:
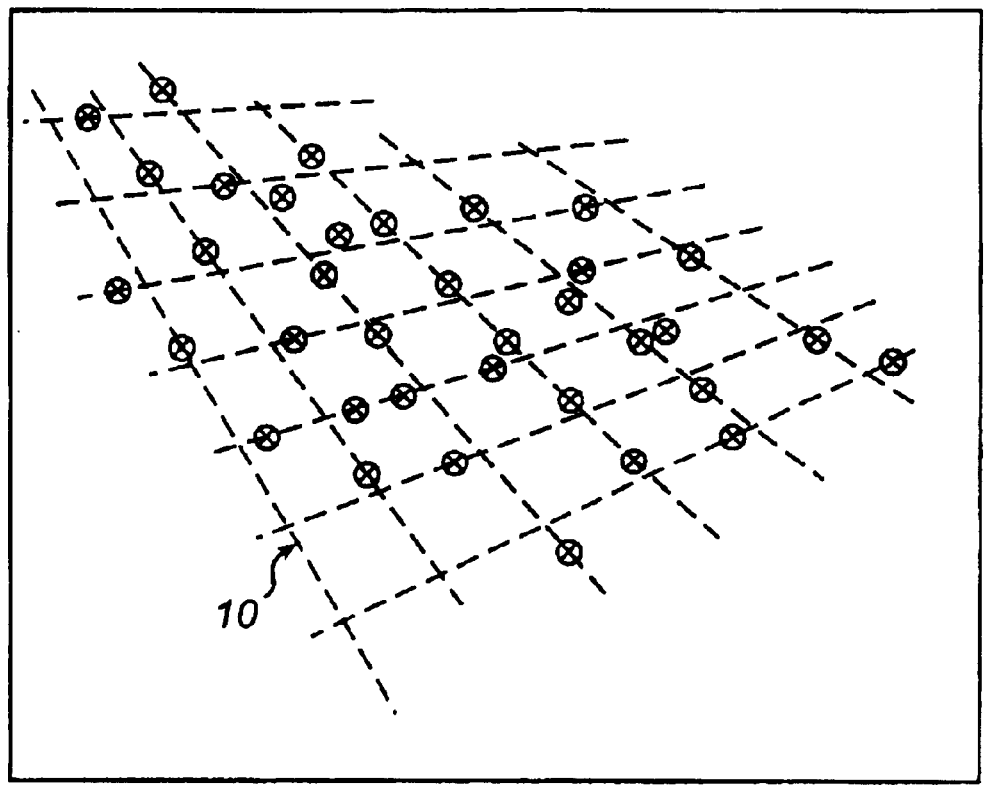
FIG. 3 shows a schematic representation of a digital image of a coding pattern of the type shown in FIG. 1.

FIG. 3 shows schematically a digital image of the above-described coding pattern. In FIG. 3, objects are indicated by rings and the corresponding ensemble of points by a cross. The virtual raster 10 is also drawn in to make things clearer. The digital image is evidently recorded with rotation and great inclination of the sensor relative to the position-coded base. It must be emphasized that FIG. 3 is a schematic example and that the number n of objects can in practice be much greater. Although each position is coded by 36 (6×6) objects, each digital image generally comprises more objects, typically n=100–200.

Figure 4:
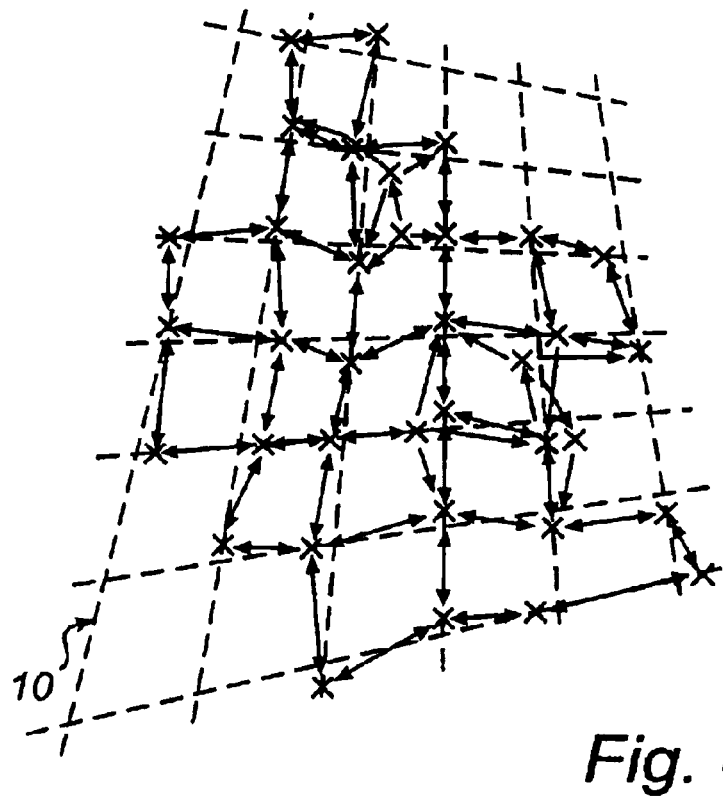
FIG. 4 shows a ensemble of points corresponding to FIG. 3, after compensation for rotation and scale errors in the image plane and after identification of the neighbor relationships between the points.

After the segmentation, the binary image is subjected to a correction process, which results in a ensemble of points substantially without rotation in the image plane. This can be achieved by Fourier analysis of the ensemble of points, as is described in detail in the above-mentioned patent publication WO 01/75783, which is incorporated herein by this reference. The Fourier analysis results in overall main vectors for the ensemble of points, i.e. main directions and spacings in the binary image. Thereafter, a linear transformation matrix is computed which transfers the main vectors to result vectors whose direction and length substantially correspond to the original raster (FIG. 1), in this case two mutually orthogonal vectors with a length ratio 1:1. The ensemble of points is then corrected for rotation and scale errors by the transformation matrix being operated on the original ensemble of points. FIG. 4 shows the result of the correction process for the ensemble of points in FIG. 3. For reasons of clarity, the virtual raster 10 is also shown, which of course is not yet reconstructed. It is clear that a nonlinear component, i.e. perspective distortion, remains in the corrected ensemble of points.

Subsequently, the data processor carries out a search process which aims to identify the neighbor relationships of the points. More specifically, for each point in the ensemble of points, a neighboring point is searched in given search directions.

Figure 5:
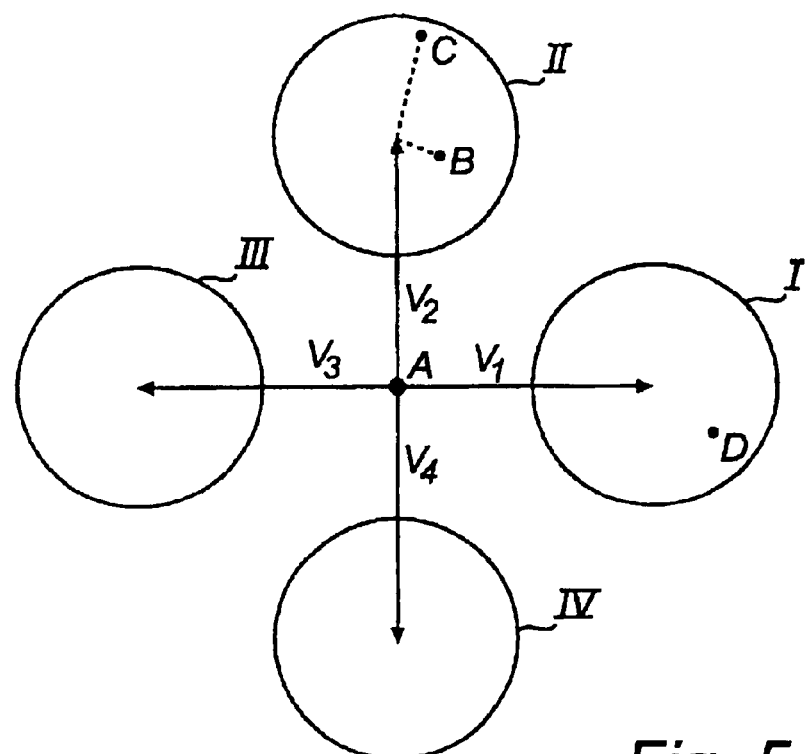
FIG. 5 illustrates a local environment of a point and associated search areas for identification of neighboring points.

The search process is illustrated in more detail in FIG. 5, based on two result vectors $v_1$, $v_2$ according to the above. In the search process, use is made of four search vectors defined on the basis of these result vectors $v_1$, $v_2$, namely: $v_1$, $v_2$, $v_3=-v_1$ and $v_4=-v_2$. Each search vector is in turn assigned a search area I-IV whose extent is set with knowledge of the structure of the coding pattern. The search areas are preferably sufficiently large to ensure detection of a point belonging to an adjoining raster intersection, but sufficiently small to avoid detection of points belonging to other raster intersections (cf. FIG. 1). In the current coding pattern, each mark is displaced ⅙ of the raster line spacing, for which reason the smallest spacing between the marks is ⅔ of the raster line spacing (marks which are offset towards one another). Perspective effects in the image can reduce this spacing, for which reason the radius of the search areas in the present example has been set at about ½ the raster line spacing.

Based on a point A in FIG. 5, one neighboring point D is identified in search area I, two potential neighboring points B and C in search area II, and no neighboring points in search areas III–IV.

If several potential neighboring points are identified per search area, the neighboring point selected is the one which is located nearest to the center of the search area, i.e. the tip of the search vector. This selection process. can also take account of the surface area of the objects corresponding to the points, for example in relation to the known nominal size of the objects. In this way it is possible to reduce the influence of noise, which as a rule results in objects of a small surface area.

Figure 6:
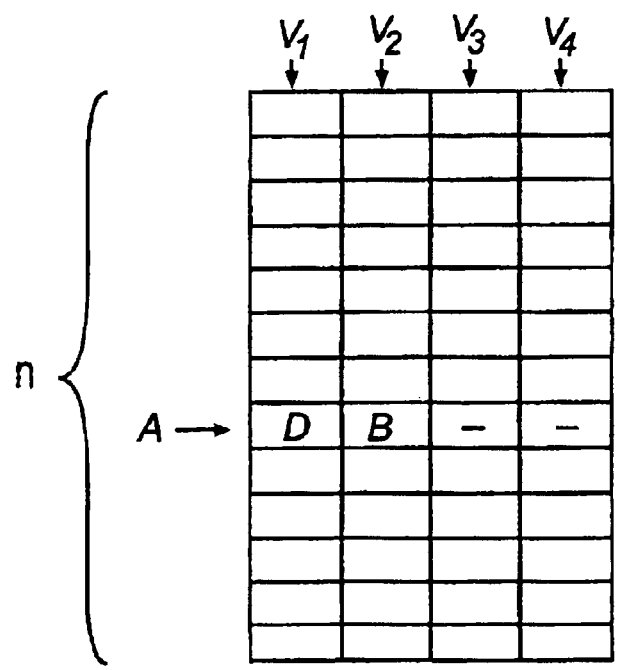
FIG. 6 shows a data structure for recording of neighbor relationships in the digital image.

During the search process, the data processor creates a table, list or other data structure containing a neighboring point in the respective search direction, for each point in the ensemble of points, as is indicated in FIG. 6. This table defines a framework or skeleton of neighbor relationships for use in the reconstruction of the virtual raster.

Referring to FIG. 4, the arrows therein represent the neighbor relationships which have been defined for the ensemble of points in FIG. 3.

However, the above-mentioned framework is further refined in two inspection steps before the data processor carries out the reconstruction of the raster.

In the first inspection step, only those points which are mutual neighbors are extracted, as is indicated by double-ended arrows in FIG. 4. A corresponding framework or skeleton is shown in FIG. 7, in which single lines indicate mutual neighbor relationships.

Figure 7:
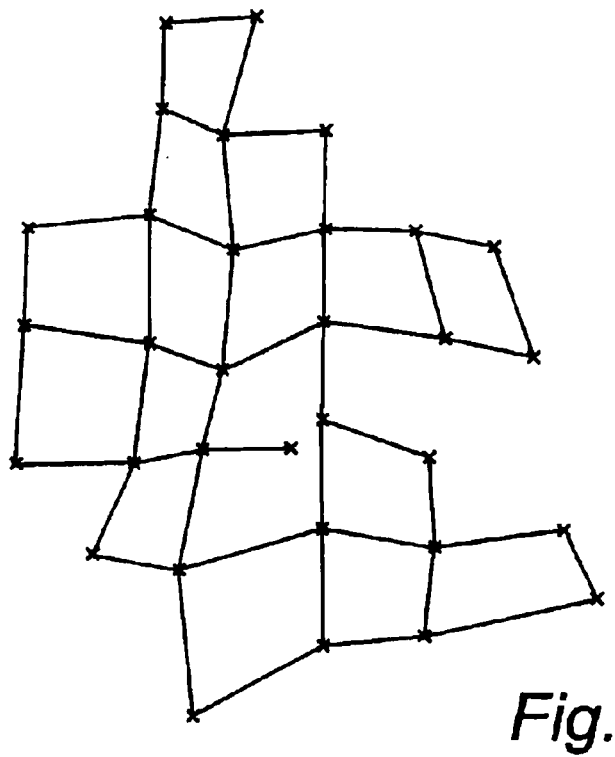
FIG. 7 illustrates a ensemble of points corresponding to FIG. 4, after extraction of points with mutual neighbor relationships which are shown as lines in FIG. 7.
Figure 8:
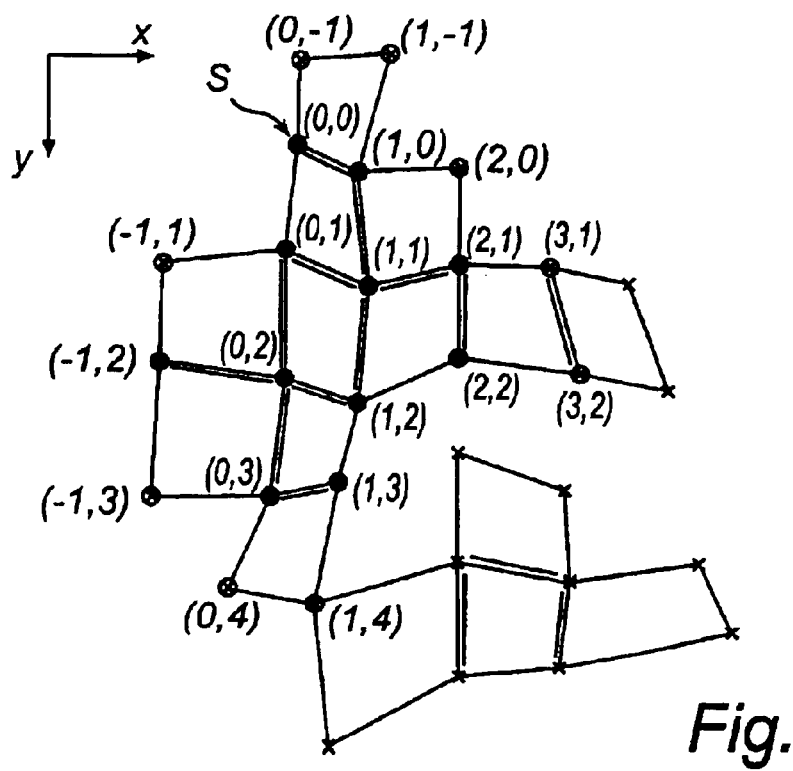
FIG. 8 illustrates a ensemble of points corresponding to FIG. 7, after extraction of points included in cyclic structures of a given format.
Figure 9:
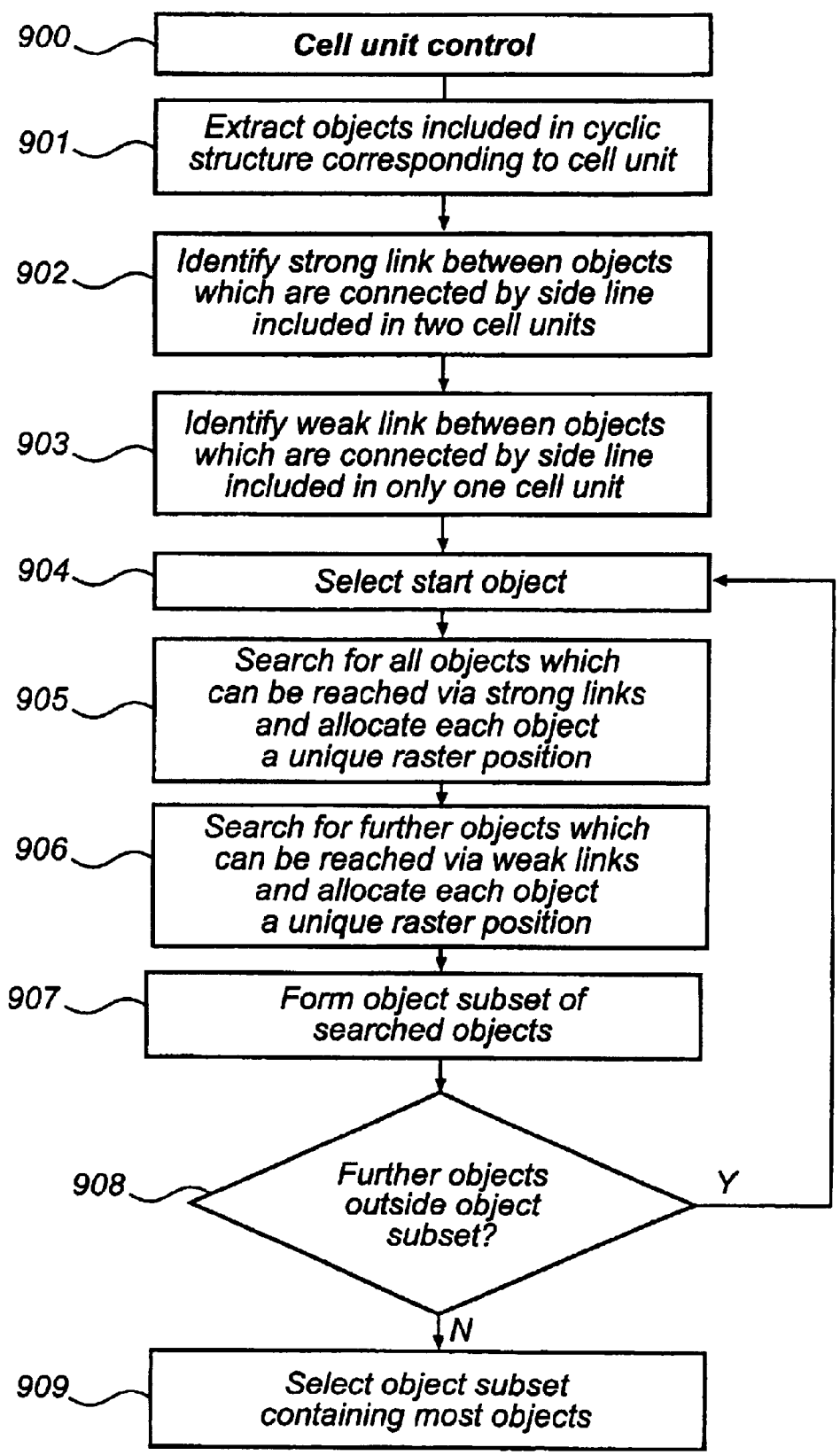
FIG. 9 is a flow chart which shows overall steps carried out for identifying the subset which will finally be used for reconstruction of the positions of the points relative to a virtual raster.

In the second inspection step, which is illustrated schematically in FIG. 9, the framework in FIG. 7 is first matched against cyclic structures of a known format (step 901). The cyclic structures can be regarded as cell units which correspond to the basic elements of the original raster. In the example, the basic elements are squares and the cell elements are any polygons with four corners each with one point (object). The cyclic structures can be identified starting from the data structure in FIG. 6 by the data processor checking, for a given point, if there is a first neighbor in the first search direction $v_1$, if the first neighbor has a second neighbor in the second search direction $v_2$, if the second neighbor has a third neighbor in the third search direction $v_3$, if the third neighbor has a fourth neighbor in the fourth search direction $v_4$, and if the fourth neighbor is identical to the given point. If so, these points are extracted and are identified as being included in a cell unit. FIG. 8 shows the cell units which have been identified based on FIG. 7.

Thereafter, the links between the points are classified. If the link is a side line which is common to two cell units, the link is classified as strong (step 902), otherwise as weak (step 903).

The classification is then used to identify a contiguous area of the framework to be used in the reconstruction. This is done by the data processor selecting a start point (step 904) from among the points included in the cell units and identifying all the strong points, i.e. points which can be reached from the start point via strong links (step 905). Thereafter, the data processor identifies all the weak points, i.e. points which can be reached from the strong points via one and only one weak link (step 906). The data processor forms a first component or subset of the identified strong and weak points (step 907) and then repeats the above look-up for other start points (step 908). These start points can expediently be chosen from among the points which are not yet included in any component, or at least from among the points which have not yet been classified as strong. In the last-mentioned case, weak points can thus be included in several components. When all possible start points have been tested, the component is selected which contains most points, or alternatively most strong points (step 909).

FIG. 8 shows the result of the second inspection step for the points extracted from the framework in FIG. 7, based on start point S. Strong and weak links are shown by double lines and single lines, respectively, and strong and weak points are shown by filled and unfilled circles, respectively.

FIG. 8 also shows that the strong and weak points, at least in the selected component, are each assigned a raster position in a raster coordinates system which may be centered (although not necessarily) at the start point S. Each raster position in the example is given by two raster coordinates in the form of integers. These raster positions are used to couple the points in the component to the raster intersections of the original coding pattern, as will be described in more detail below.

Figure 15:
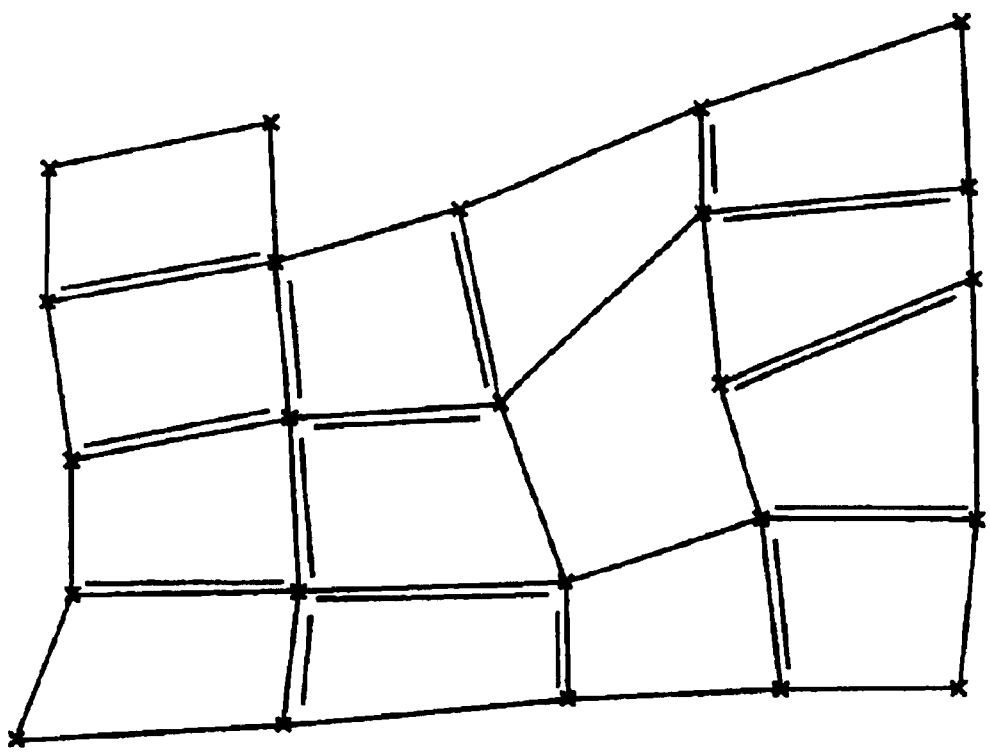
FIG. 15 is a view, corresponding to FIG. 7, of an alternative ensemble of points after extraction of points with mutual neighbor relationships.

The aim of the above classification of the links is to minimize the occurrence of errors when a component is formed from several locally identified cell units. FIG. 15 shows an example of a framework of mutual neighbor relationships between points/objects in, an image. Although each cell unit appears correctly identified in its local environment, the cell units as a whole contain a geometric error. If the component is built up on the basis of only strong links, this type of geometric error is minimized because the strong links are included in two cell units and are thus defined with greater reliability than the weak links.

Since the subsequent reconstruction is improved with the number of points included in the selected component, it is however possible to allow weak links to contribute a further point to the component, as was described in the above example. Although it is not evident from the example in FIG. 8, it may be expedient to reduce the effect of the weak points relative to the strong points, for example by means of the weak points being given a raster position which is defined in only one dimension, and more specifically in such a way that a weak point is allocated the raster coordinate which is common to the weak point and the strong point which links the weak point to the current component.

The virtual raster will then be reconstructed based on the selected component in FIG. 8.

Figure 10:
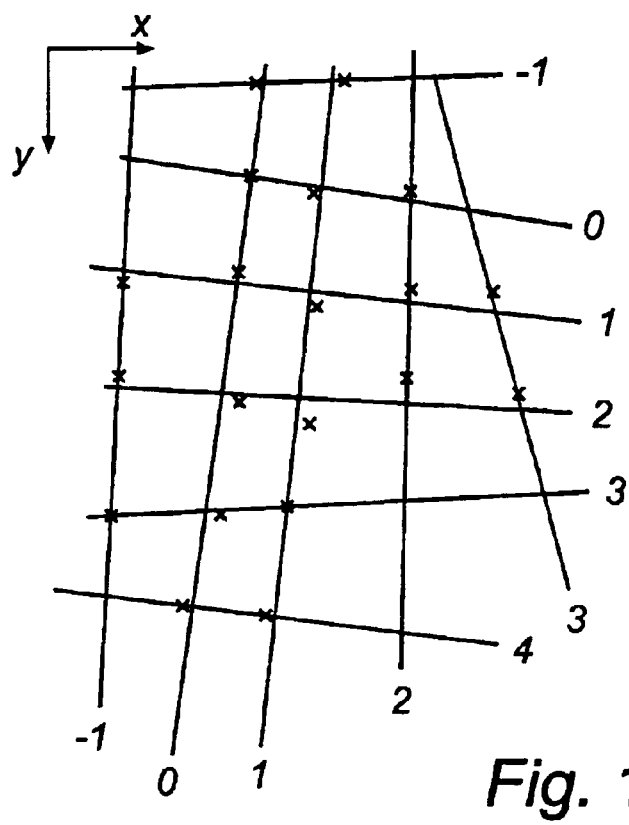
FIG. 10 illustrates, based on the ensemble of points in FIG. 8, a first partial step in the reconstruction according to a first embodiment.

According to a first embodiment of this reconstruction process, the data processor 25 carries out a regression adaptation of groups of points to straight lines which approximate raster lines, as is indicated in FIG. 10. More specifically, the points are grouped according to their raster positions. Thus, based on FIG. 8, vertical groups have been formed with points whose raster positions in a first dimension are given by −1, 0, 1, 2 and 3, and horizontal groups with points whose raster positions in a second dimension are given by −1, 0, 1, 2, 3 and 4. The direction of each individual line may have low precision on account of the small number of points per line, especially at the periphery of the selected component. Therefore, the data processor 25 carries out a supplementary regression adaptation in which the coefficient of inclination of the vertical and horizontal lines is adapted to a linear function in the horizontal and vertical directions. Perspective effects mean in fact that that mutually parallel lines are oriented towards a common point of perspective. This is shown, for example, in the above-mentioned patent publication WO 01/75783 which is incorporated herein by reference.

Figure 11:
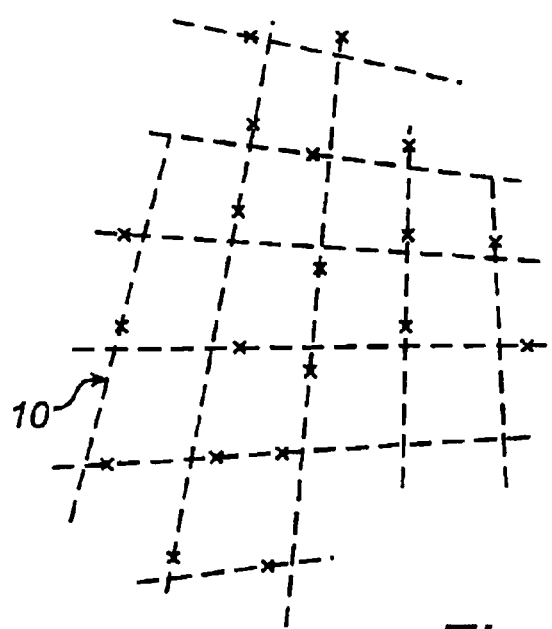
FIG. 11 illustrates the final result of the reconstruction according to the first embodiment.

After the second regression adaptation, new raster lines can be computed which constitute a substantially correct reconstruction of the virtual raster 10, as is shown in FIG. 11.

The data processor 25 can alternatively carry out the supplementary regression adaptation by adapting the mutual spacings between adjacent vertical and horizontal lines to a linear function along a horizontal or vertical direction vector. In this case too, it is possible to reconstruct the raster lines which form the virtual raster.

When the virtual raster is known, the data processor can then decode the points in the selected component and on the basis of this compute the position of the sensor device on the position-coded base. It is also conceivable that the decoding process is based on points not included in the selected component, and/or on a subset of the points in the selected component. For details concerning the decoding, reference is made to the above-mentioned patent publications WO 01/16691, WO 01/26032 and WO 01/26033 which are incorporated herein by reference.

Figure 12:
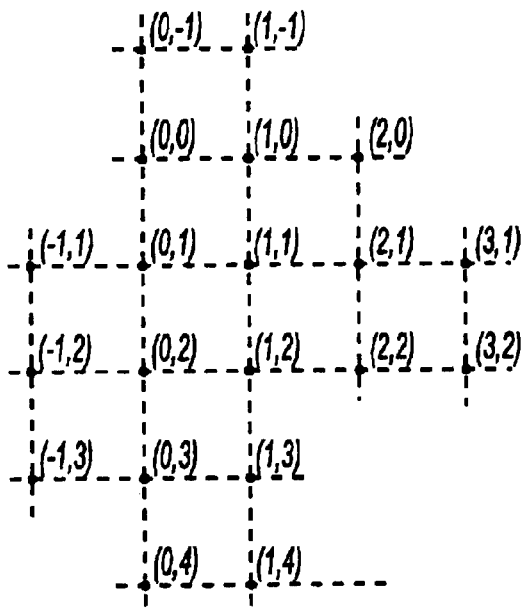
FIG. 12 illustrates, based on the ensemble of points in FIG. 8, a reference ensemble of points used in the reconstruction according to a second embodiment.

According to a second embodiment of the reconstruction process, the data processor 25 carries out the reconstruction by computing a homogeneous transformation matrix. In this case, each point in the non-corrected binary image (FIG. 3) belonging to the selected component, as shown in FIG. 8, is compared with a corresponding raster intersection in an ideal raster, as shown in FIG. 12. Here, the raster positions are used to identify points and corresponding raster intersections, as is also indicated in FIGS. 8 and 12. A system of equations can thus be set up containing twelve unknown parameters (of the transformation matrix) and equations which in number are twice as many as the points in the selected component, in a manner similar to that described in "Digital Image Processing" by R. F. Gonzalez and R. E. Woods, Addison-Wesley, 1992, pp 67–68. Knowing that all points originate from one and the same geometric plane (i.e. the base), the number of unknown parameters can be reduced to eight.

There are many different known numerical methods for solving redundant systems of equations of the kind defined above. The embodiment presently preferred is based on a method of least squares.

It may appear unexpected that a correct homogeneous transformation matrix can be computed by coupling the points in FIG. 3 to the raster intersections in FIG. 12, since the points, because of their displacements (cf. FIG. 1), do not correspond exactly to the raster intersections. However, the computed transformation matrix represents a form of mean value across a large number of points, for which reason the displacements substantially cancel each other out mathematically.

Figure 13:
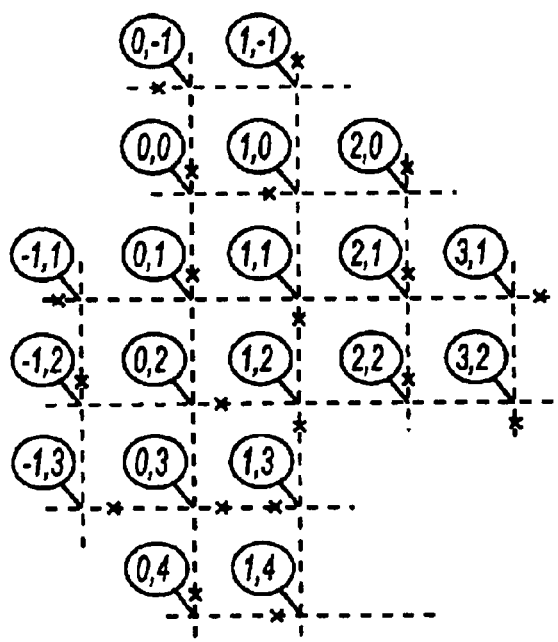
FIG. 13 illustrates the final result of the reconstruction according to the second embodiment.

When the homogeneous transformation matrix has been computed, it is operated on the points of the selected component in the non-corrected binary image (FIG. 3), which points are then transferred to their correct locations in relation to a reconstructed raster whose raster intersections are given by the raster positions, as is indicated in FIG. 13.

As an alternative to the above, the homogeneous transformation matrix may be calculated based on a comparison of the points in the selected component in the rotation-corrected image (FIG. 8) and the corresponding raster intersections of the ideal raster (FIG. 12). In this case, the homogeneous transformation matrix is instead operated on the points of the selected component in the rotation-corrected binary image, thereby to reconstruct the raster.

Figure 14:
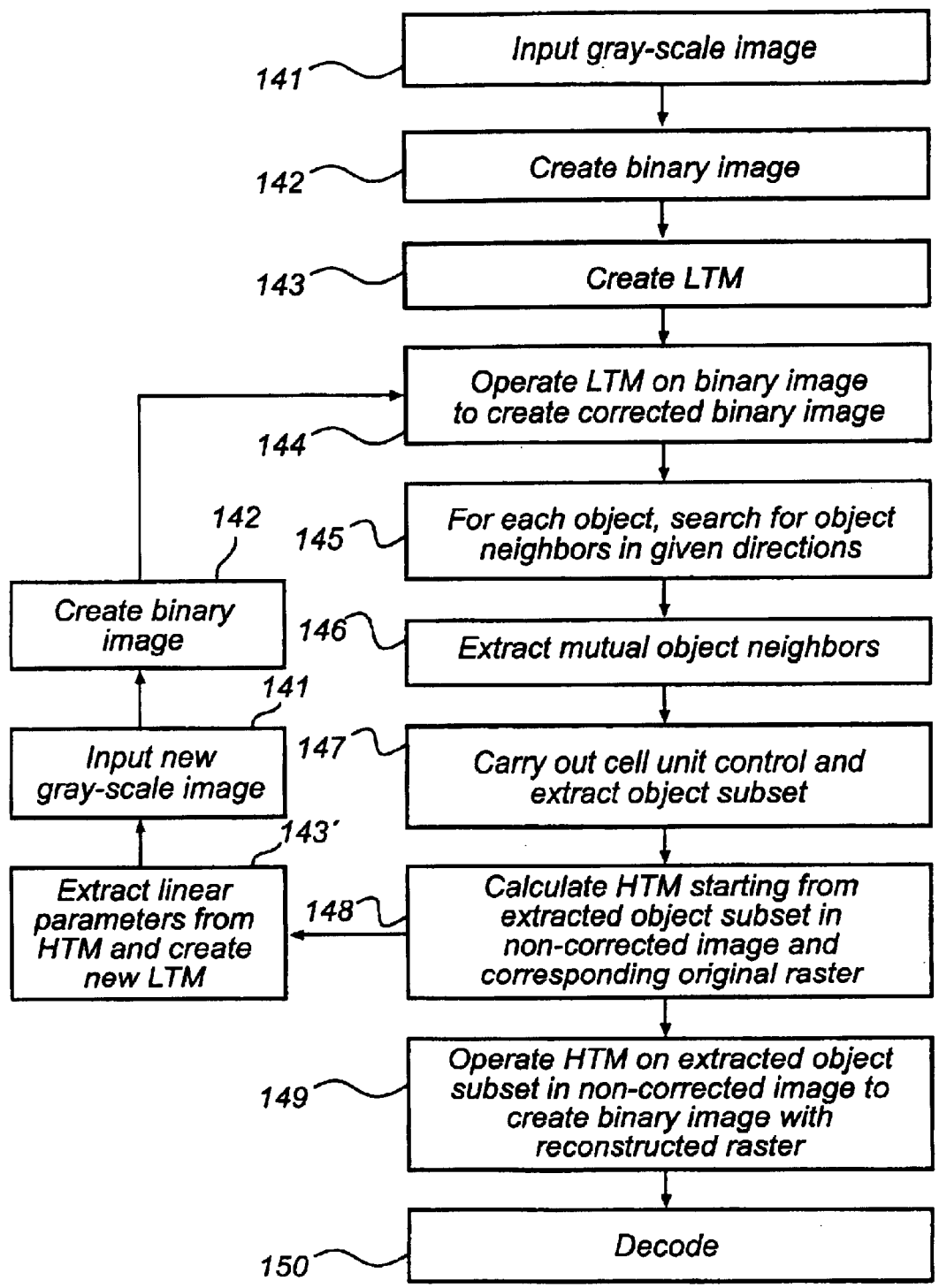
FIG. 14 is a flow chart showing overall steps which can be carried out in the reconstruction according to the second embodiment.

Now follows a description, in which reference is made to FIG. 14, of the overall method steps carried out by the data processor 25 when processing a sequence of gray-scale images according to the above second embodiment.

First, a current gray-scale image is input (step 141) and processed in a segmentation process which results in current binary image (step 142). A current ensemble of points is then preferably extracted from the current binary image. Thereafter, a linear transformation matrix LTM is computed, for example via Fourier analysis of the current ensemble of points (step 143). The linear transformation matrix is then used to correct the current ensemble of points for rotation and any scale errors (step 144). Then, the search process is carried out (step 145), as are also the first and second inspection steps (steps 146–147) which result in a selected component, i.e. a selected subensemble of points. Finally, the data processor 25 computes a homogeneous transformation matrix HTM on the basis of the selected component's points (step 148), whereupon the homogeneous transformation matrix is operated on the component's points in order to create a reconstructed raster with associated points (step 149) which are then decoded (step 150).

In digitization of handwriting, the latter should be recorded at a sampling rate of about 50–100 Hz for correct reproduction. However, at this sampling rate, relatively small changes occur in rotation and inclination of the pen between successive images. This can be utilized to minimize the computing work in producing a new linear transformation matrix LTM for a subsequent gray-scale image. Instead of carrying out a relatively time-consuming and computation-intensive analysis, for example via Fourier transformation, the linear parameters are copied from the homogeneous transformation matrix HTM into the linear transformation matrix LTM (step 143'), whereupon the transformation matrix thus updated is used during the correction process (step 144). Thus, processor power can be freed in the data processor 25 for other computations, for example decoding.

In the case of the homogeneous transformation matrix being calculated based on the rotation-corrected image, the linear parameter extraction should be made from a second homogeneous transformation matrix which is formed by combining the linear transformation matrix with the homogeneous transformation matrix, typically by matrix multiplication.

The above-described second embodiment is in effect a generally applicable, computation-efficient method of correcting for geometrical perspective distortion in a sequence of digital representations of a coding pattern. Such a method may comprise: correcting a current digital representation for rotation in its plane, by means of a first transformation matrix; selecting a subset of objects in the thus rotation-corrected digital representation; computing a homogeneous transformation matrix based on the subset of objects and corresponding elements of said coding pattern; operating the homogeneous transformation matrix on the digital representation to produce a perspective-corrected digital representation; and updating the first transformation matrix, based on the homogeneous transformation matrix thus-computed, before processing of a subsequent digital representation. The step of updating the first transformation matrix suitably comprises inserting relevant linear parameters from the homogeneous transformation matrix into the first transformation matrix. The corresponding elements may comprise code marks of the code pattern or points of intersection of raster lines included in the coding pattern. The digital representation may be an original digital image, a binarized version thereof, or any other data structure representing the digital image. As explained above in relation to the second embodiment, the subset of objects used in the computation of the homogeneous transformation matrix may be taken from either the digital representation or the rotation-corrected version thereof. In the former case, the homogeneous transformation matrix should be modified, by means of the first transformation matrix, before the step of updating the first transformation matrix.

All methods described above may be realized using program code which is executed in the processor means 25a (FIG. 2) of the digital pen, or in an external processing unit (not shown) connected to the pen. The program code can be provided on a storage medium, for example in the form of a diskette, a CD-ROM, or propagating signals via a computer network. Alternatively, the method can be realized by a hardware circuit and/or discrete analog/digital components, possibly in combination with execution of program code as stated above.

It should be noted that the scope of patent protection sought is not limited by the embodiments described above. The invention can be varied and modified in a number of ways within the scope of the appended claims.

For example, the technique according to the invention can be applied also to coding patterns based on other basic raster elements such as hexagons, rectangles, triangles, etc., or other marks such as dashes, ellipses, triangles, two-dimensions bar codes, etc., placed with or without displacement relative to the points of intersection of a virtual raster pattern. Is should also to be understood that the coding pattern can code any type of suitable data, such as any one of those mentioned above by reference to the background art.

It should also be noted that the above correction process is not restricted to the use of Fourier transform, and instead it can be carried out by any other method suitable for the purpose, for example by Hough transform, Walsh transform, etc. Moreover, it is not by any means necessary to carry out any correction, and instead the search process can be carried out on the basis of the overall main vectors instead of the result vectors. An initial correction can, however, make it easier to implement the subsequent search process since the same search areas can be used for all points and all images.

According to a further alternative without a correction process, the second inspection process is carried out as a regular geometric matching of the ensemble of points against a set of different possible cell units. For example, the data processor 25 can be arranged, on the basis of a computed current perspective, to retrieve possible cell units from a library in its memory means 25b. For example, a square sum of the deviations between points and corresponding corners of each cell unit can be used as matching criterion, in which case the square sum should be lower than a limit value for correspondence to be considered to be present.

According to another conceivable alternative, an initial correction process takes place, followed by a regular geometric matching of the ensemble of points against the known basic elements of the coding pattern. Here too, a square sum of the deviations between points and corner positions can be used as matching criterion.

What is claimed is:

1. A method for reconstruction of a virtual raster based on objects in a digital image, the objects at least partially reproducing marks on a base, and each mark being associated with a respective point of intersection of raster lines belonging to the virtual raster, said method comprising: matching sets of objects against a cell unit, which corresponds to a recurring known basic element of said raster; when a set corresponds with the cell unit, identifying the objects in the set as approved; and reconstructing the virtual raster on the basis of the mutual arrangement of the approved objects.

2. The method as claimed in claim 1, in which the objects in the image are represented by a ensemble of points.

3. The method as claimed in claim 1, in which the cell unit is associated with a given number of objects.

4. The method as claimed in claim 1, in which the cell unit is a polygon whose corners connected via side lines are each associated with an object.

5. The method as claimed in claim 1, comprising:
forming a subset of objects containing approved objects which form a contiguous area corresponding to a plurality of adjacent cell units; and reconstructing the virtual raster on the basis of the subset of objects.

6. The method as claimed in claim 5, in which the contiguous area is formed so as to at least comprise the approved objects which are connected in pairs by a side line common to two cell units.

7. The method as claimed in claim 5, in which the subset of objects is formed so as to contain the greatest possible number of approved objects.

8. The method as claimed in claim 1, comprising the initial step of creating a data structure containing the neighbor relationships of the objects, the matching comprising identifying said sets by using the data structure.

9. The method as claimed in claim 1, further comprising: determining, in the digital image, main vectors which reproduce its general raster line directions and raster line spacings; on the basis of the main vectors, identifying the neighbor relationships of the objects by identifying, for each object, another object as neighbor in the respective raster line direction; and subsequently carrying out the matching step on the basis of the neighbor relationships of the objects.

10. The method as claimed in claim 8, in which the objects included in a set are identified as approved if they form as neighbors a cyclic structure which corresponds to the cell unit, at least with respect to the number of objects associated therewith.

11. The method as claimed in claim 9, in which the objects included in a set are identified as approved if they form as neighbors a cyclic structure which corresponds to the cell unit, at least with respect to the number of objects associated therewith.

12. The method as claimed in claim 1, comprising:
allocating each of the approved objects a raster position in a raster coordinate system on the imaged base, the virtual raster being reconstructed on the basis of the location of the objects in the digital image and their allocated raster position on the base.

13. The method as claimed in claim 1, in which reconstructing the virtual raster comprises computing the raster lines by regression adaptation of the location of the approved objects along given directions.

14. The method as claimed in claim 5 or 13, in which the directions are given by raster positions, preferably by integer coordinates in a raster coordinates system, which raster positions are assigned the approved objects in conjunction with the step of forming the subset of objects.

15. The method as claimed in claim 1, in which the step of reconstructing the virtual raster comprises computing a homogeneous transformation matrix based on the positional relationships between the approved objects and the corresponding points of intersection which are located on the base and whose mutual arrangement is defined by the basic element.

16. The method as claimed in claim 6 or 15, in which the positional relationships are given by raster positions, preferably by integer coordinates in a raster coordinate system, which raster positions are assigned the approved objects in conjunction with the step of forming the subset of objects.

17. The method as claimed in claim 16, for processing of a sequence of digital images, comprising:
correcting a current digital image for rotation in its plane, by means of a first transformation matrix;, computing the homogeneous transformation matrix based on the image thus rotation-corrected; and updating the first transformation matrix before processing of a subsequent digital image.

18. The method as claimed in claim 17, in which the updating of the first transformation matrix comprises extracting relevant linear parameters from the homogeneous transformation matrix.

19. The method as claimed in claim 1, in which the matching is carried out only for the objects which are mutual neighbors.

20. A computer program which comprises program code which, when executed in a computer, causes the computer to implement a method as claimed in any one of claims 1–13, 15, and 17–19.

21. A computer-readable storage medium on which a computer program is stored which, when executed in a computer, causes the computer to implement a method as claimed in any one of claims 1–13, 15, and 17–19.

22. A device for position-decoding which computes a position on the basis of a digital representation of a partial area of a position-coding pattern, said position-coding pattern comprising marks which are each associated with a respective point of intersection of raster lines belonging to a virtual raster, said digital representation comprising objects which at least partially reproduce said marks; wherein said device comprises: means for matching sets of said objects against a cell unit which corresponds to a recurring known basic element of said raster; means for identifying, when a set corresponds with said cell unit, the objects in said set as approved; means for reconstructing the virtual raster on the basis of the mutual arrangement of the thus-approved objects; and means for computing said position on the basis of said virtual raster and said objects in said digital representation.

* * * * *